United States Patent
Li et al.

(10) Patent No.: US 10,033,548 B2
(45) Date of Patent: Jul. 24, 2018

(54) METHOD, SYSTEM, SERVICE SELECTION ENTITY, AND SERVICE MANAGEMENT ENTITY FOR SELECTING SERVICE PROVISION ENTITY

(71) Applicant: Huawei Technologies Co., Ltd., Shenzhen (CN)

(72) Inventors: Feng Li, Nanjing (CN); Yue Yin, Nanjing (CN); Jin Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 14/817,650

(22) Filed: Aug. 4, 2015

(65) Prior Publication Data

US 2015/0341448 A1 Nov. 26, 2015

Related U.S. Application Data

(63) Continuation of application No. 12/975,091, filed on Dec. 21, 2010, now Pat. No. 9,130,782, which is a (Continued)

(30) Foreign Application Priority Data

Jun. 23, 2008 (CN) .......................... 2008 1 0127175

(51) Int. Cl.
  *G06F 15/16* (2006.01)
  *H04L 12/64* (2006.01)
  (Continued)

(52) U.S. Cl.
  CPC ........ *H04L 12/6418* (2013.01); *H04L 67/104* (2013.01); *H04L 67/16* (2013.01)

(58) Field of Classification Search
  CPC ... H04L 67/16; H04L 12/6418; H04L 67/104; G06F 3/0481; G06F 17/30876;
  (Continued)

(56) References Cited

U.S. PATENT DOCUMENTS 5,521,910 A    5/1996   Matthews
6,069,896 A *   5/2000   Borgstahl ............ H04L 12/2803
                                                                                                                           370/260
(Continued)

FOREIGN PATENT DOCUMENTS

CN         1925444 A     3/2007
CN    101061699 A    10/2007
(Continued)

*Primary Examiner* — Zarni Maung
(74) *Attorney, Agent, or Firm* — Brinks Gilson & Lione

(57) ABSTRACT

The present invention discloses a method, system, service selection entity, and service management entity for selecting a service provision entity in a peer-to-peer (P2P) network communication, so as to select heterogeneous service provision entities for heterogeneous service requesting entities. The method includes: receiving service capability information of service provision entities; obtaining service request information of a service requesting entity; and selecting a service provision entity of an appropriate service capability to provide a service for the service requesting entity according to the service capability information of service provision entities and the service request information of the service requesting entity. The present invention is applicable to P2P overlay networks, wherein the service selection entity, the service requesting entities, and the service provision entity each comprises a respective network enabled communication device selected from anyone of: a client device, a server, and a storage device for peer-to-peer (P2P) network communication.

12 Claims, 11 Drawing Sheets

Related U.S. Application Data continuation of application No. PCT/CN2009/071367, filed on Apr. 20, 2009.

(51) Int. Cl.
  *H04L 29/08* (2006.01)
  *G06F 12/00* (2006.01)

(58) Field of Classification Search
  CPC ............ G06F 21/552; G06F 17/3053; G06F 17/30554; G06F 3/0485; G06F 9/505
  USPC ..................... 709/217–218, 223–229, 250
  See application file for complete search history.

(56) References Cited

U.S. PATENT DOCUMENTS

| | | | |
|---|---|---|---|
| 6,501,761 B1 | 12/2002 | Pannell et al. | |
| 6,510,138 B1 | 1/2003 | Pannell | |
| 6,567,403 B1 | 5/2003 | Congdon et al. | |
| 6,587,467 B1 | 7/2003 | Morgenstern et al. | |
| 6,809,547 B2 | 10/2004 | Ingino et al. | |
| 6,813,483 B1 | 11/2004 | Lynch et al. | |
| 6,928,557 B1 | 8/2005 | Inoue et al. | |
| 7,019,637 B1 | 3/2006 | Johnson et al. | |
| 7,020,487 B2 | 3/2006 | Kimata | |
| 7,038,487 B2 | 5/2006 | Ingino et al. | |
| 7,302,505 B2 | 11/2007 | Ingino, Jr. et al. | |
| 7,346,078 B2 | 3/2008 | Gulati et al. | |
| 7,373,325 B1 | 5/2008 | Hadingham et al. | |
| 7,373,644 B2* | 5/2008 | Aborn ................ | H04L 67/1008 709/223 |
| 7,376,907 B2* | 5/2008 | Santoro ............... | G06F 3/0481 715/729 |
| 7,756,928 B1* | 7/2010 | Meenan ............... | G06F 9/5055 709/205 |
| 7,886,064 B2 | 2/2011 | Nomura et al. | |
| 9,130,782 B2* | 9/2015 | Li ....................... | H04L 12/6418 |
| 2003/0018551 A1* | 1/2003 | Hanson ............... | G06Q 10/087 705/35 |
| 2003/0069749 A1 | 4/2003 | Shear et al. | |
| 2006/0101109 A1 | 5/2006 | Nishio | |
| 2007/0226338 A1 | 9/2007 | Burch et al. | |
| 2007/0286378 A1 | 12/2007 | Brown et al. | |
| 2008/0008305 A1 | 1/2008 | Neuhaus | |
| 2008/0071727 A1 | 3/2008 | Nair et al. | |
| 2008/0109242 A1 | 5/2008 | Shear et al. | |
| 2008/0120204 A1* | 5/2008 | Conner ............... | G06Q 10/087 705/28 |
| 2008/0130639 A1* | 6/2008 | Costa-Requena ......... | G06F 8/65 370/389 |
| 2008/0225889 A1 | 9/2008 | Truong et al. | |
| 2008/0268915 A1 | 10/2008 | Miyauchi et al. | |
| 2009/0132942 A1* | 5/2009 | Santoro ............... | G06F 3/0481 715/765 |
| 2009/0177772 A1 | 7/2009 | Guan | |
| 2010/0023606 A1* | 1/2010 | Gerdes ................ | H04L 67/16 709/221 |
| 2010/0061316 A1 | 3/2010 | Levenshteyn et al. | |
| 2010/0192175 A1* | 7/2010 | Bachet ............... | G06Q 10/0637 725/31 |
| 2011/0004699 A1 | 1/2011 | Han et al. | |

FOREIGN PATENT DOCUMENTS

| | | |
|---|---|---|
| CN | 101132390 A | 2/2008 |
| CN | 101471838 A | 7/2009 |
| CN | 101534241 A | 9/2009 |
| EP | 1 377 107 A2 | 1/2004 |
| EP | 1 816 796 A2 | 8/2007 |
| EP | 2 216 940 A1 | 8/2010 |
| JP | 2005-073067 A | 3/2005 |
| JP | 4284400 B2 | 6/2009 |
| KR | 2002-0031224 A | 5/2002 |
| KR | 10-1044455 B1 | 6/2011 |
| WO | WO 2007/083306 A2 | 7/2007 |
| WO | WO 2009/086764 A1 | 7/2009 |
| WO | WO 2009/111968 A1 | 9/2009 |
| WO | WO 2009/155802 A1 | 12/2009 |

\* cited by examiner

METHOD, SYSTEM, SERVICE SELECTION ENTITY, AND SERVICE MANAGEMENT ENTITY FOR SELECTING SERVICE PROVISION ENTITY

CROSS-REFERENCE TO RELATED APPLICATIONS

This application is a continuation of U.S. patent application Ser. No. 12/975,091, filed on Dec. 21, 2010, which is a continuation of International Application No. PCT/CN2009/071367, filed on Apr. 20, 2009, which claims priority to Chinese Patent Application No. 200810127175.3, filed on Jun. 23, 2008. The afore-mentioned patent applications are hereby incorporated by reference in their entireties.

FIELD OF THE INVENTION

The present invention relates to peer-to-peer (P2P) networks, and in particular, to a method, system, service selection entity, and service management entity for selecting a service provision entity.

BACKGROUND OF THE INVENTION

In a P2P system, two or more personal computers (PCs) or other devices communicate or collaborate over the network and share common resources including central processing units (CPUs), programs and data. In a P2P structure, there is no central peer or central server. Each peer serves as an information consumer, an information provider, and an information medium. In the P2P network, every peer plays the same role, each computer has equal privileges and obligations, and there is no differentiation as between a server and a client in a client/server (C/S) system.

FIG. 1 illustrates a P2P overlay network with a peer-client structure. All peers together form the P2P overlay network. A client is attached to a peer and is only able to publish and receive content. It does not participate in the routing and searching of the P2P overlay network. Client 1 publishes content (key/value) onto the P2P overlay network through a Put command. Peer 1 finds root peer 2 dedicated to storing key/value pairs according to a specific P2P rule, such as a distributed hash table (DHT) algorithm. Peer 2 stores the key/value pair, which records the value corresponding to each key. Normally, a value is the content corresponding to a key. The content may be true content or a source address that provides the content. When client 2 requests the same key, client 2 sends a Get command to the P2P overlay network to search for a value corresponding to the key. Peer 3 finds root peer 2 dedicated to storing key/value pairs according to a specific P2P rule, such as a DHT algorithm. Finally, peer 2 returns the value corresponding to the key (that is, the content published by client 1 or the address of client 1 that provides the content) to client 2.

According to a prior art, a procedure for selecting a service provision entity in a P2P network includes: selecting a peer of low network cost in the local location or local domain as the service provision entity according to the network information reported by the physical network. A procedure for changing the service provision entity includes: after a client is aware of the fault of a service provision entity, the client sets up a connection with and requests the service from a new service provision entity.

During related researches, the inventor finds the following problem in the prior art:

Because the stability of the selected service provision entity is not evaluated in advance, reselection and changing of the service provision entity frequently occur due to the instability of the service provision entity. For real-time services like video on demand (VoD) and Internet Protocol Television (IPTV), or service requesters with specific requirements, a service provision entity selected according to physical network information cannot assure the stability of service provision. Moreover, it takes time to switch to a new service provision entity after the client detects the fault of the selected service provision entity. This means a delay to the client and therefore does not meet the real-time requirement of the client.

SUMMARY OF THE INVENTION

Embodiments of the present invention provide a method, system, service selection entity, service provision entity, request management entity, and service management entity for selecting a service provision entity in a P2P network, so as to select heterogeneous service provision entities for heterogeneous service requesting entities in the P2P network.

The following technical solution is provided:

A method for selecting a service provision entity in a P2P network includes:

receiving by a service selection entity, service capability information of service provision entities;

obtaining by a service selection entity, service request information of a service requesting entity; and selecting by a service selection entity, a service provision entity of an appropriate service capability to provide a service for the service requesting entity according to the service capability information of service provision entities and the service request information of the service requesting entity, wherein the service selection entity, the service requesting entities, and the service provision entity each comprises a respective network enabled communication device selected from anyone of: a client device, a server, and a storage device for peer-to-peer (P2P) network communication.

A method for selecting a service provision entity in a P2P network includes:

receiving by a service selection entity, service capability information of service provision entities;

obtaining by a service selection entity, a service type requested by a service requesting entity or statistics of request information of all service requesting entities; and selecting by a service selection entity, an appropriate service provision entity to provide a service for the service requesting entity according to the service type or statistics and the service capability information of service provision entity, wherein the service selection entity, the service requesting entity, and the service provision entity each comprises a respective network enabled communication device selected from anyone of: a client device, a server, and a storage device for peer-to-peer (P2P) network communication.

A P2P network system includes:

at least one service provision entity, configured to publish respective service capability information;

a service requesting entity, configured to send service request information; and a service selection entity, configured to receive the service capability information of the at least one service provision entity and the service request information of the service requesting entity, and select a service provision entity of an appropriate service capability according to the service capability information of the at least one service provision entity and the service request information of the service requesting entity, wherein the service selection entity, the service requesting entity, and the service provision entity each comprises a respective network enabled communication device selected from anyone of: a client device, a server, and a storage device for peer-to-peer (P2P) network communication.

A service selection entity for selecting a service provision entity in a peer-to-peer (P2P) network, the service selection entity comprises a network interface card for P2P network communication, a processor coupled to a memory which stores instruction codes which when executed by the processor, configure the service selection entity to:

obtain a quantity of service requesting entities requesting specific content;

decide an evaluated grade of the specific content according to the quantity of the service requesting entities; and select a service provision entity providing the specific content according to the evaluated grade of the specific content, wherein the service selection entity, the service requesting entities, and the service provision entity each comprises a respective network enabled communication device selected from anyone of: a client device, a server, and a storage device for peer-to-peer (P2P) network communication.

A service management entity comprises a network interface card for P2P network communication, a processor coupled to a memory which stores instruction codes which when executed by the processor, configure the service management entity to:

receive statistics of request information of all service requesting entities;

decide an evaluated grade of a data stream currently transferring content according to the statistics of request information of all service requesting entities; and request a service selection entity to select a service provision entity of an appropriate service capability according to the evaluated grade of the data stream currently transferring content.

In the technical solution of the embodiments of the present invention, the service selection entity receives service capability information of service provision entities; the service selection entity obtains service request information of the service requesting entity; and the service selection entity selects a service provision entity of an appropriate service capability for the service requesting entity according to the service request information of the service requesting entity. Thereby, heterogeneous service provision entities can be selected for heterogeneous service requesting entities in a P2P network.

DETAILED DESCRIPTION OF THE EMBODIMENTS

To make the technical solution of the present invention more comprehensible, the present invention is described in detail with reference to the accompanying drawings and embodiments. It should be noted that throughout the description of the various embodiments, terms such as "service selection entity", "service requesting entity", and "service provision entity" may each be a respective network enabled communication device communicating to a peer-to-peer (P2P) network. In addition, each of the respective network enabled communication device may be selected from anyone of: a client device, a server, and a storage device.

In addition, the respective "service selection entity", "service requesting entity", and "service provision entity" may each comprise a network interface card for network communication, one or more processor coupled to a memory which stores instruction codes which when executed by the one or more processor, may configure the respective "service selection entity", "service requesting entity", and "service provision entity" to perform P2P entity selection or service management functions.

Figure 1:
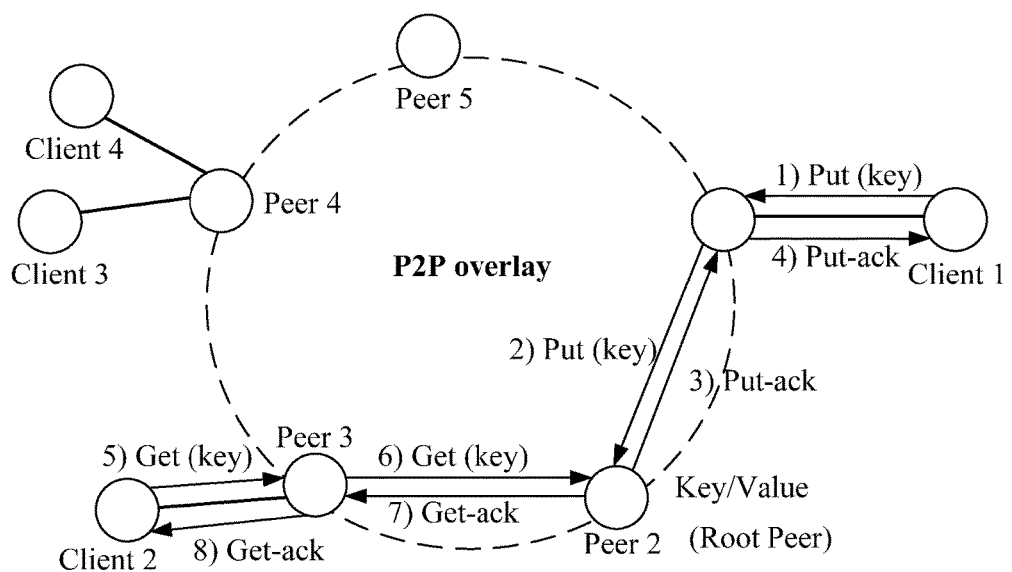
FIG. 1 illustrates a P2P network with a peer-client structure in a prior art.
Figure 2:
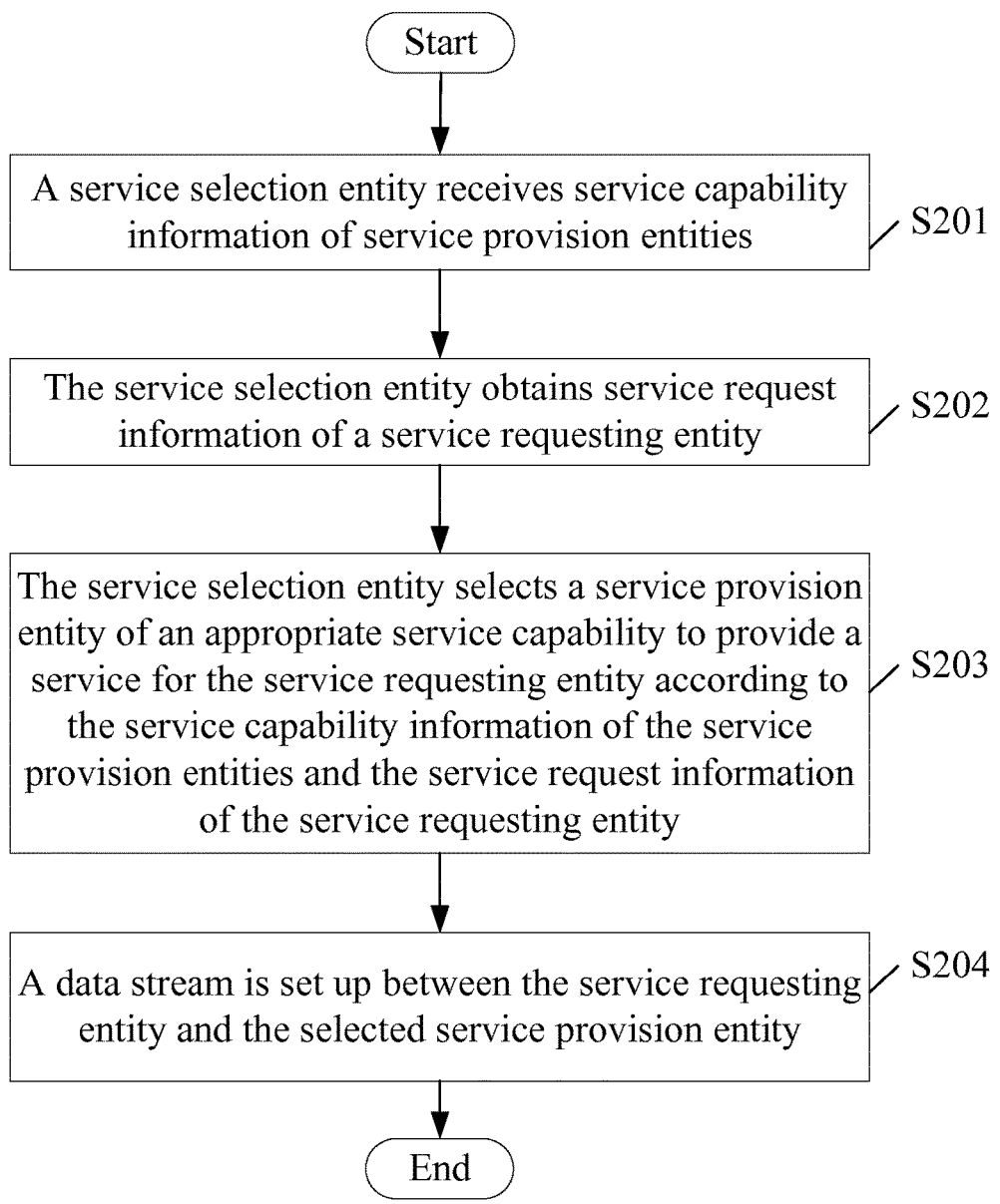
FIG. 2 is a workflow of a method for selecting a service provision entity in a P2P network according to an embodiment of the present invention.

A method for selecting a service provision entity in a P2P network according to an embodiment of the present invention is described with reference to FIG. 2 and FIG. 3. The method includes the following steps:

S201. A service selection entity receives service capability information of service provision entities.

When the P2P network has a peer-client structure, the step of receiving service capability information of service provision entities is: the service selection entity receives the service capability information of each service provision entity through a service management entity, where the service provision entity belongs to a peer managed by the service management entity.

When the service provision entity publishes content to the service selection entity, the service provision entity also publishes its service capability, which may be indicated by a tag. The tag may be "media server", "VIP server", or "supporting multicast", or it may be represented by a score. In the embodiment of the present invention, service provision entities 2, 3, and 5 all publish content key1 and the service selection entity stores the information published by the service provision entities 2, 3, and 5 in a key-value-tag table, such as Table 1.

TABLE 1

| Key  | Value                     | Tag                          |
|------|---------------------------|------------------------------|
| Key1 | Service provision entity 1 | Media server                |
|      | Service provision entity 2 | P2P network cache           |
|      | Service provision entity 3 | Common (80)                 |
|      | Service provision entity 4 | Common (45)                 |
|      | Service provision entity 5 | VIP server                  |
| Key2 | Service provision entity 1 | Media server                |
|      | Service provision entity 6 | Common (65)                 |
|      | Service provision entity 7 | Supporting unicast fast filling |
|      | Service provision entity 8 | Supporting replication      |
|      | Service provision entity 9 | Supporting multicast        |

In Table 1, key1 and key2 are content keys and service provision entities 1-9 are different values. The tag indicates the service capability of a service provision entity. For example, service provision entity 1 is a media server, and its tag is "media server"; service provision entity 2 supports P2P network cache, and its tag is "P2P network cache"; for a common service provision entity, a score can be provided according to its maximum bandwidth and the computing capability of its CPU, where a higher score means a higher service capability.

S202. The service selection entity obtains service request information of a service requesting entity.

When the P2P network has a peer-client structure, the step of obtaining service request information of a service requesting entity is: the service selection entity obtains service request information of the service requesting entity through a request management entity, where the service requesting entity belongs to a peer managed by the request management entity.

In this step, the service selection entity may receive the service request of the service requesting entity, where the service request carries a service type identifier. The service type may be: common service request, unicast fast filling service request, replication service request, multicast service request, or VIP service request.

S203. The service selection entity selects a service provision entity of the appropriate service capability to provide a service for the service requesting entity, according to the service capability information of the service provision entities and the service request information of the service requesting entity.

In the embodiment of the present invention, the service selection entity obtains the service type identifier carried in the service request of the service requesting entity and selects an appropriate service provision entity from the key-value-tag table according to the service type identifier.

Figure 3:
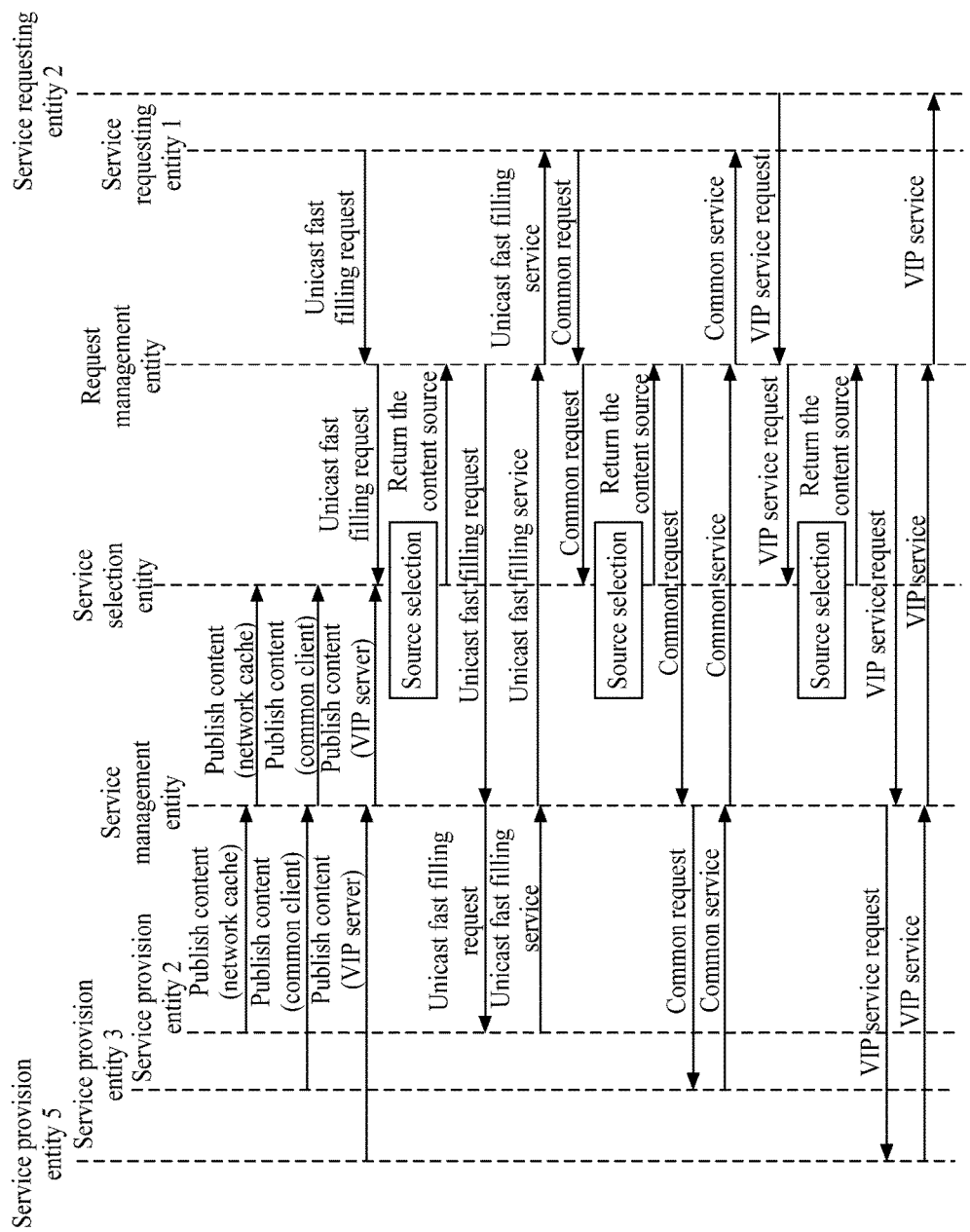
FIG. 3 illustrates a procedure of the method for selecting a service provision entity in a P2P network shown in FIG. 2.

The workflow in FIG. 3 includes but is not limited to the following occasions:

(1) When the service type requested by the service requesting entity is common service, the service selection entity selects a service provision entity whose service capability information is common service capability, which can reduce the burden of media servers.

(2) When the service type requested by the service requesting entity is VIP service, the service selection entity selects a stable service provision entity whose service capability information is VIP server or media server, which can meet the needs of VIP clients.

(3) When the service type requested by the service requesting entity is unicast fast filling, the service selection entity selects a service provision entity whose service capability information is supporting unicast fast filling.

(4) When the service type requested by the service requesting entity is replication, the service selection entity selects a service provision entity whose service capability information is supporting replication.

(5) When the service type requested by the service requesting entity is multicast, the service selection entity selects a service provision entity whose service capability information is supporting multicast. Thereby, a service provision entity that meets the service need is selected. The above method also realizes the switching between the unicast fast filling service and the replication service or the switching between the unicast fast filling service and the multicast service.

The method according to the embodiment of the present invention may further include:

S204. A data stream is set up between the service requesting entity and the selected service provision entity.

In a P2P network, service provision entities are different devices such as mobile phones, common computers, and servers. These devices provide different performance and different bandwidths and therefore, service provision entities are heterogeneous. Service requesting entities are also heterogeneous because the devices serving as service requesting entities are also different and have different storage spaces. As a result, the service requests of them also vary. In the method for selecting a service provision entity in a P2P network provided according to the embodiment of the present invention, the service selection entity receives service capability information of service provision entities; the service selection entity obtains service request information of the service requesting entity; and the service selection entity selects a service provision entity of the appropriate service capability for the service requesting entity according to the service request information of the service requesting entity.

The embodiment of the present invention assumes the P2P network has a peer-client structure. Those skilled in the art understand that the embodiment of the present invention is also applicable to other P2P network structures.

Figure 4:
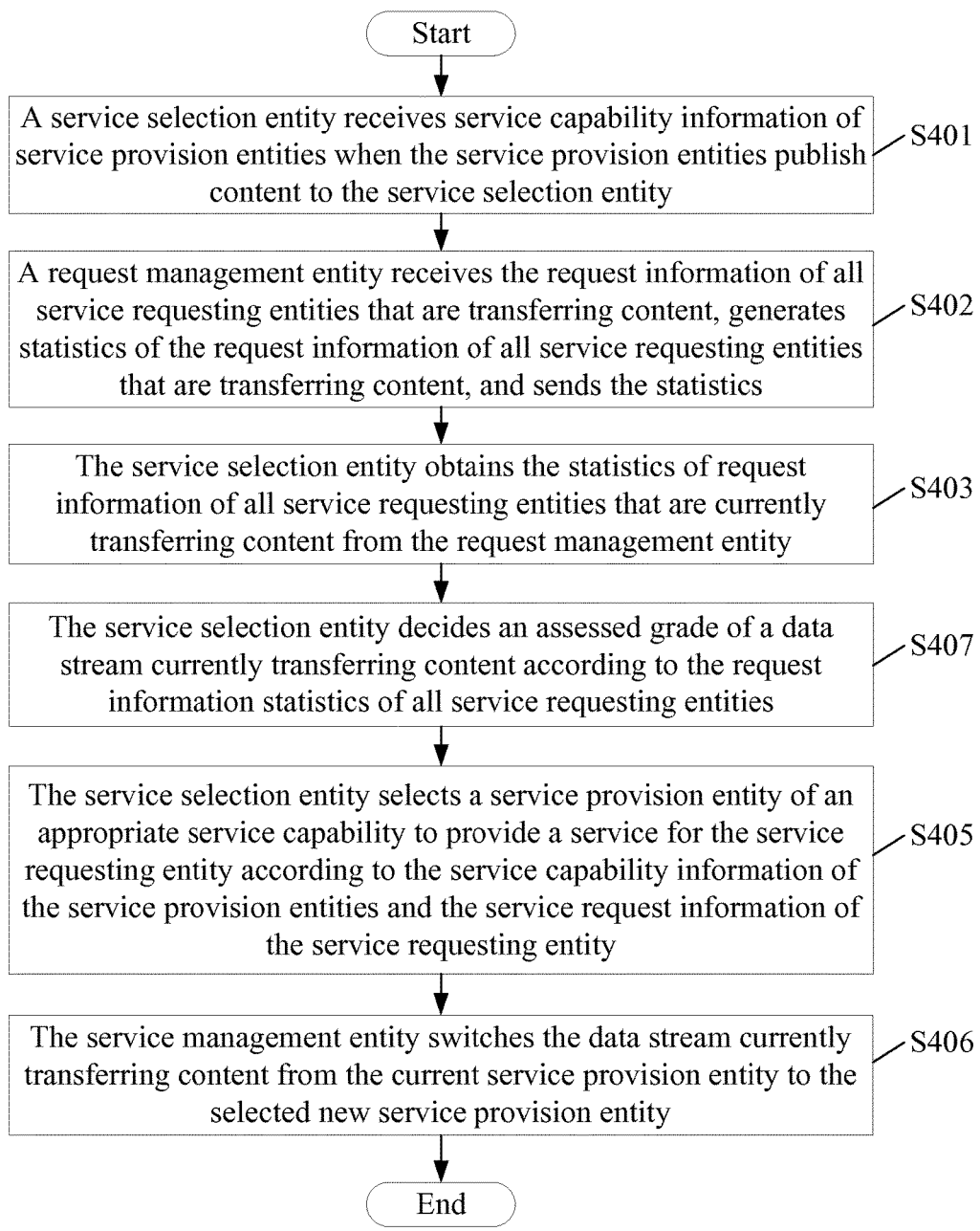
FIG. 4 is a workflow of a method for selecting a service provision entity in a P2P network according to a second embodiment of the present invention.
Figure 5:
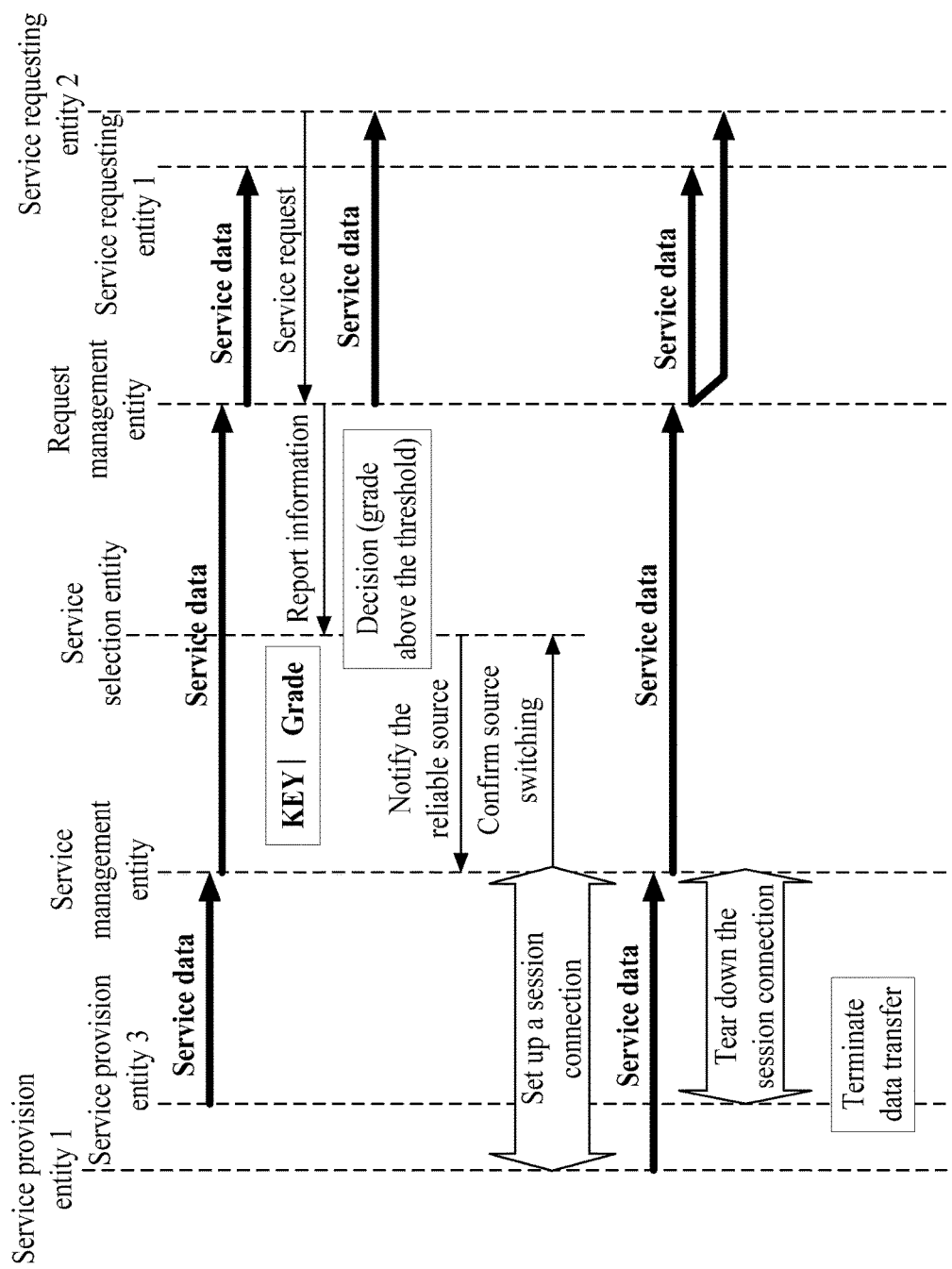
FIG. 5 illustrates a procedure of the method for selecting a service provision entity in a P2P network shown in FIG. 4.

A method for selecting a service provision entity in a P2P network according to another embodiment of the present invention is described with reference to FIG. 4 and FIG. 5. In the embodiment, the P2P network has a peer-client structure. The method includes the following steps:

S401. A service selection entity receives service capability information of a service provision entity when the service provision entity publishes content to the service selection entity.

Table 2 shows a key-value-tag table of service provision entities stored on a service selection entity.

TABLE 2

| Key  | Value                     | Tag |
|------|---------------------------|-----|
| Key1 | Service provision entity 1 | C   |
| Key2 | Service provision entity 2 | S   |

In the embodiment of the present invention, the tag of a service provision entity indicates the service capability of the service provision entity. The tag "C" indicates a common service provision entity while the tag "S" indicates a stable service provision entity.

S402. A request management entity receives the request information of all service requesting entities that are currently transferring content and generates statistics of the request information of all service requesting entities that are currently transferring content.

The statistics of the request information of all service requesting entities that are currently transferring content include: total number of service requesting entities, and/or delay sensitiveness of each service requesting entity, and/or real-time requirement of each service requesting entity.

Every time a new service requesting entity initiates a service request for key1, the request management entity generates statistics including the total number of service requesting entities that request key1 and the delay sensitiveness of each service requesting entity, and/or the real-time requirement of each service requesting entity, and sends the statistics to the service selection entity.

S403. The service selection entity obtains the statistics of request information of all service requesting entities that are currently transferring content from the request management entity.

S404. The service selection entity decides an evaluated grade of the data stream currently transferring content according to the request information statistics of all service requesting entities.

The service selection entity records a key-grade table, where the grade indicates the evaluated importance of the data stream currently transferring content.

S405. The service selection entity selects a service provision entity of the appropriate service capability to provide a service for the service requesting entity, according to the service capability information of the service provision entities and the service request information of the service requesting entity.

When the evaluated grade of the data stream currently transferring content is above a first threshold, the service selection entity selects a new service provision entity that has a higher service capability than the current service provision entity; when the evaluated grade of the data stream currently transferring content is below a second threshold, the service selection entity selects a service provision entity that has a lower service capability than the current service provision entity; the first threshold is larger than or equal to the second threshold.

The first threshold or the second threshold is set according to actual service needs.

The service selection entity compares the grade in the key-grade table with the first threshold and the second threshold and judges whether to initiate active source switching. If the active source switching condition is met, the service selection entity queries the local key-value-tag table and selects a service provision entity of the appropriate service capability. Then, the service selection entity returns the query result to a service management entity and the service management entity triggers an active source switching procedure.

S406. The service management entity switches the data stream currently transferring content from the current service provision entity to the selected new service provision entity.

If the current data stream is decided as important, the service management entity may switch the data stream to a stable service provision entity to assure the stability required by the client; if the current data stream is decided as not so important, the service management entity may switch the data stream to a service provision entity of a common service capability so that resources are more reasonably allocated.

Optionally, before the switching of the data stream currently transferring content from the current service provision entity to the selected new service provision entity, the method further includes: judging whether the current service provision entity is faulty and if so, switching the data stream to the new service provision entity. In the embodiment of the present invention, the service selection entity records the evaluated grade of the data stream currently transferring content but does not judge whether it is necessary to change the service provision entity. The service provision entity is changed only when the current service provision entity is found faulty. In the process of selecting the service provision entity, if the service management entity decides that the service data stream is important, the service management entity triggers a source switching procedure to switch to a stable service provision entity; if the service management entity decides that the service data stream is a common data stream, the service management entity triggers the switching to a new common service provision entity. Thereby, a service provision entity of the appropriate service capability is selected according to the needs of the client.

In the embodiment of the present invention, different grades are decided for different service data streams and differentiated maintenance is provided for service data streams of different grades. An important data stream is actively switched to a service provision entity of a higher service capability, thus avoiding the delay caused by source fault detection which is necessary if a data stream is switched only after a source fault is detected. In addition, a reliable service provision entity is selected for an important service request or an important data stream, which avoids frequent change of the service provision entity due to the instability of the service provision entity.

Figure 6:
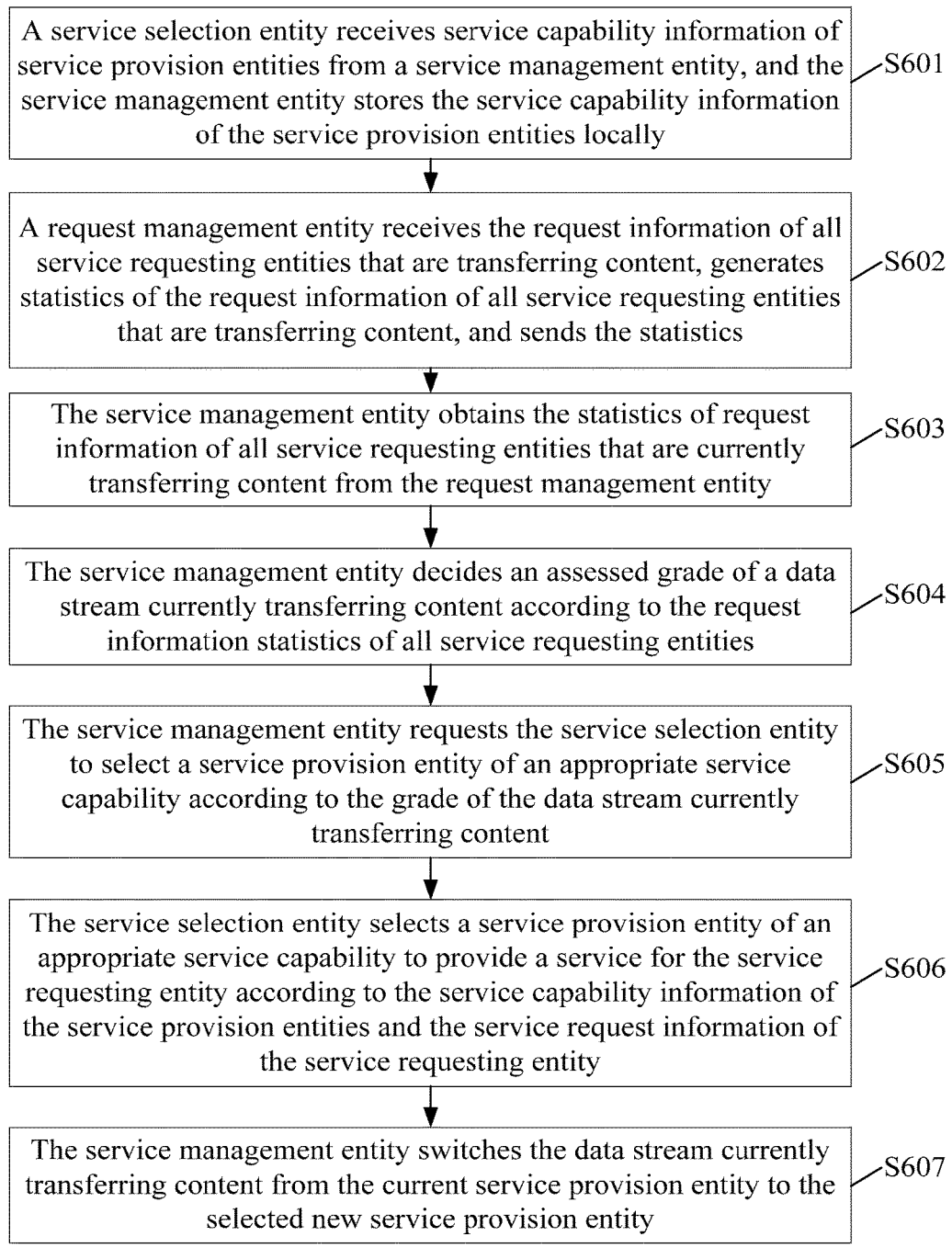
FIG. 6 is a workflow of a method for selecting a service provision entity in a P2P network according to a third embodiment of the present invention.
Figure 7:
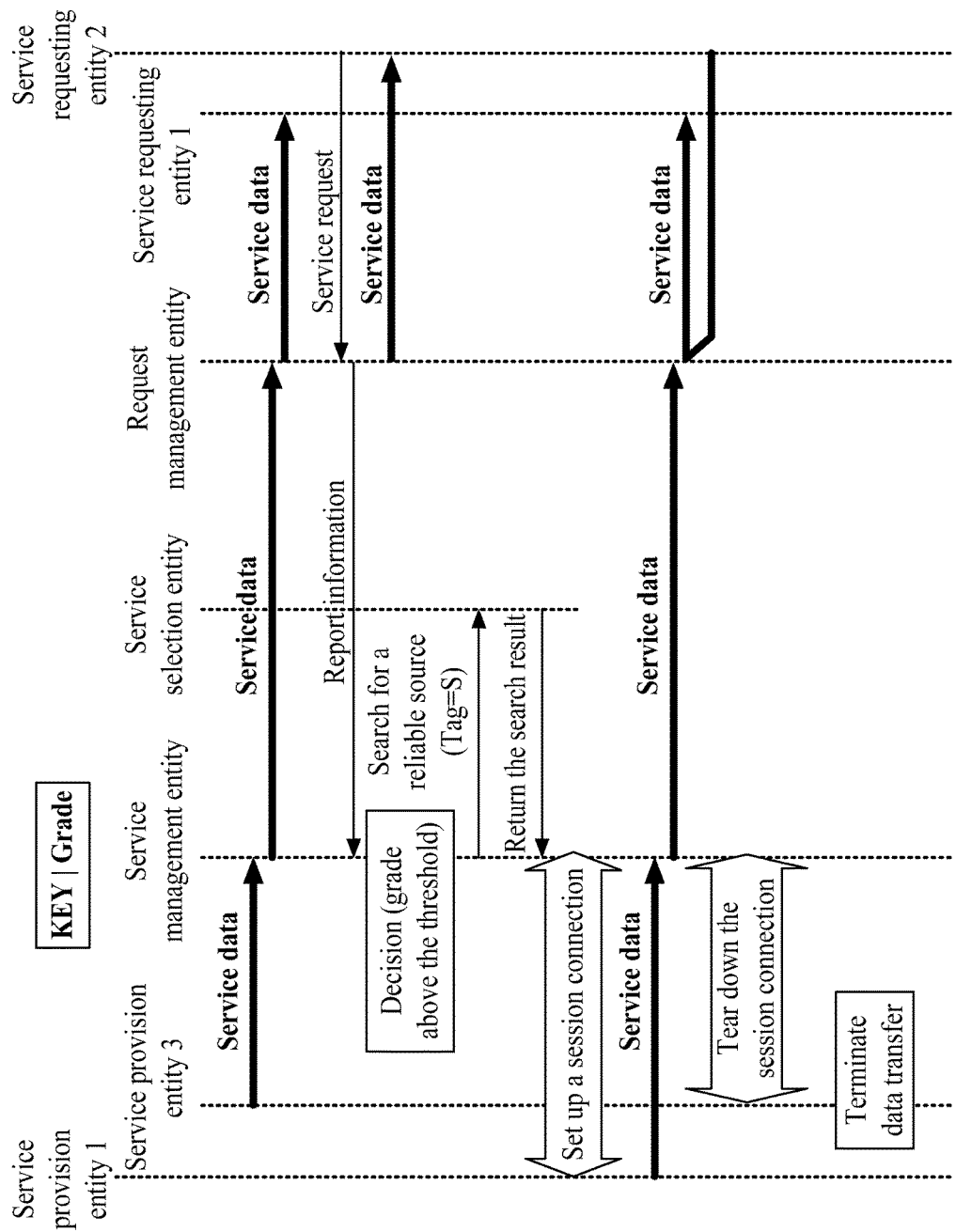
FIG. 7 illustrates a procedure of the method for selecting a service provision entity in a P2P network shown in FIG. 6.

A method for selecting a service provision entity in a P2P network according to another embodiment of the present invention is described with reference to FIG. 6 and FIG. 7. In this embodiment, the P2P network has a peer-client structure. The method includes the following steps:

S601. A service selection entity receives service capability information of a service provision entity from a service management entity, and the service management entity stores the service capability information of the service provision entity locally. The service provision entity belongs to a peer managed by the service management entity.

When the service provision entity publishes content to the service selection entity, the service provision entity also publishes its service capability.

Table 3 shows a service capability table of service provision entities, namely, a key-value-tag table, stored on a service selection entity.

TABLE 3

| Key | Value | Tag |
| --- | --- | --- |
| Key1 | Service provision entity 1 | C |
| Key2 | Service provision entity 2 | S |

S602. A request management entity receives the request information of all service requesting entities that are transferring content and generates statistics of the request information of all service requesting entities that are transferring content.

The statistics of the request information of all service requesting entities that are currently transferring content include: total number of service requesting entities, and/or delay sensitiveness of each service requesting entity, and/or real-time requirement of each service requesting entity.

S603. The service management entity obtains the statistics of request information of all service requesting entities that are currently transferring content from the request management entity.

S604. The service management entity decides an evaluated grade of the data stream currently transferring content according to the request information statistics of all service requesting entities.

This embodiment differs from the preceding embodiment in that the service management entity records the key-grade table, where the grade indicates the evaluated importance of the data stream currently transferring content.

S605. The service management entity requests the service selection entity to select a service provision entity of an appropriate service capability according to the evaluated grade of the data stream currently transferring content.

The service management entity compares the grade in the key-grade table with a first threshold and a second threshold and judges whether it is necessary to initiate active source switching.

When the evaluated grade of the data stream currently transferring content is above the first threshold, the service management entity requests the service selection entity to select a new service provision entity that has a higher service capability than the current service provision entity.

When the evaluated grade of the data stream currently transferring content is below the second threshold, the service management entity requests the service selection entity to select a new service provision entity that has a lower service capability than the current service provision entity. The first threshold is larger than or equal to the second threshold.

Optionally, when all service provision entities currently transferring content belong to one peer managed by the service management entity, the service management entity selects a service provision entity of the appropriate service capability directly according to the locally stored service capability information of service provision entities, thus reducing the delay caused by changing of the service provision entity.

S606. The service selection entity selects a service provision entity of the appropriate service capability to provide a service for the service requesting entity, according to the service capability information of the service provision entities and the service request information of the service requesting entity.

S607. The service management entity switches the data stream currently transferring content from the current service provision entity to the selected new service provision entity.

In the embodiment of the present invention, different grades are decided for different service data streams and differentiated maintenance is provided for service data streams of different grades. An important data stream is actively switched to a service provision entity of a higher service capability, thus avoiding the delay caused by source fault detection which is necessary if a data stream is switched only after a source fault is detected. In addition, a reliable service provision entity is selected for an important service request or an important data stream, which avoids frequent change of the service provision entity due to the instability of the service provision entity.

Optionally, before the switching of the data stream currently transferring content from the current service provision entity to the selected new service provision entity, the method further includes: judging whether the current service provision entity is faulty and if so, switching the data stream to the new service provision entity. In the embodiment of the present invention, the service management entity records the evaluated grade of the data stream currently transferring content in the key-grade table but does not judge whether it is necessary to change the service provision entity. The service provision entity is changed only when the current service provision entity is found faulty. In the process of selecting the service provision entity, if the service management entity decides that the service data stream is important, the service management entity triggers a source switching procedure to switch to a stable service provision entity; if the service management entity decides that the service data stream is a common data stream, the service management entity triggers the switching to a new common service provision entity.

Those skilled in the art understand that all or part of steps in the methods provided according to the preceding embodiments of the present invention can be implemented by hardware under the instruction of a software program. The software program may be stored in a computer readable medium, such as a read only memory (ROM), a random access memory (RAM), a magnetic disk, or a compact disk-read only memory (CD-ROM).

Figure 8:
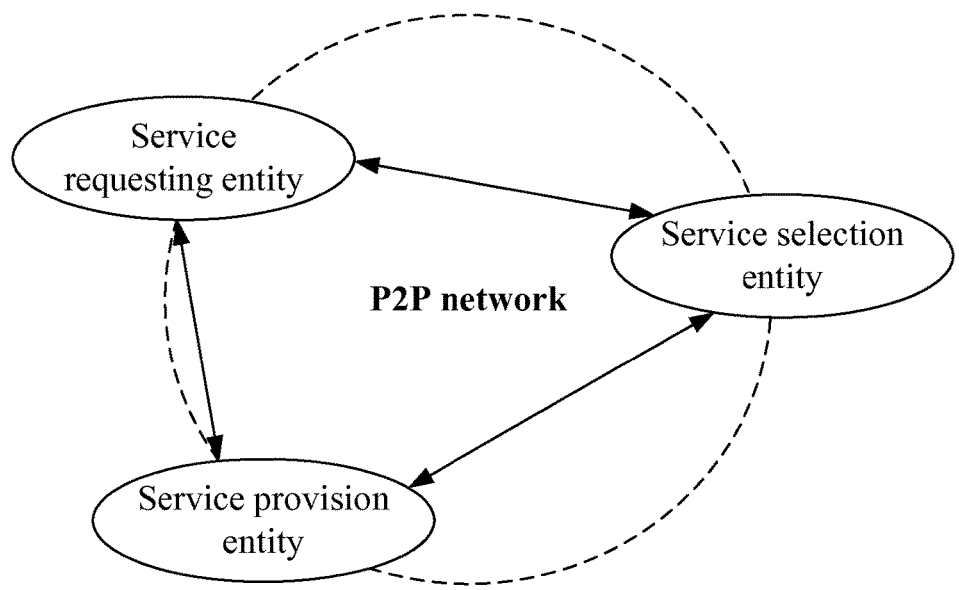
FIG. 8 illustrates a structure of a P2P network system according to a first embodiment of the present invention.

FIG. 8 illustrates a P2P network system provided according to an embodiment of the present invention. The system includes:

at least one service provision entity, configured to publish respective service capability information;

a service requesting entity, configured to send service request information; and a service selection entity, configured to receive the service capability information of the at least one service provision entity and the service request information of the service requesting entity, and select a service provision entity of an appropriate service capability according to the service capability information of the at least one service provision entity and the service request information of the service requesting entity.

In the P2P network system of the embodiment of the present invention, the service provision entities publish respective service capability information; the service requesting entity sends service request information; the service selection entity receives the service capability information of the service provision entities and the service request information of the service requesting entity, and selects a service provision entity of the appropriate service capability according to the service request information of the service requesting entity. Thereby, heterogeneous service provision entities can be selected for different service requesting entities in the P2P network.

Figure 9:
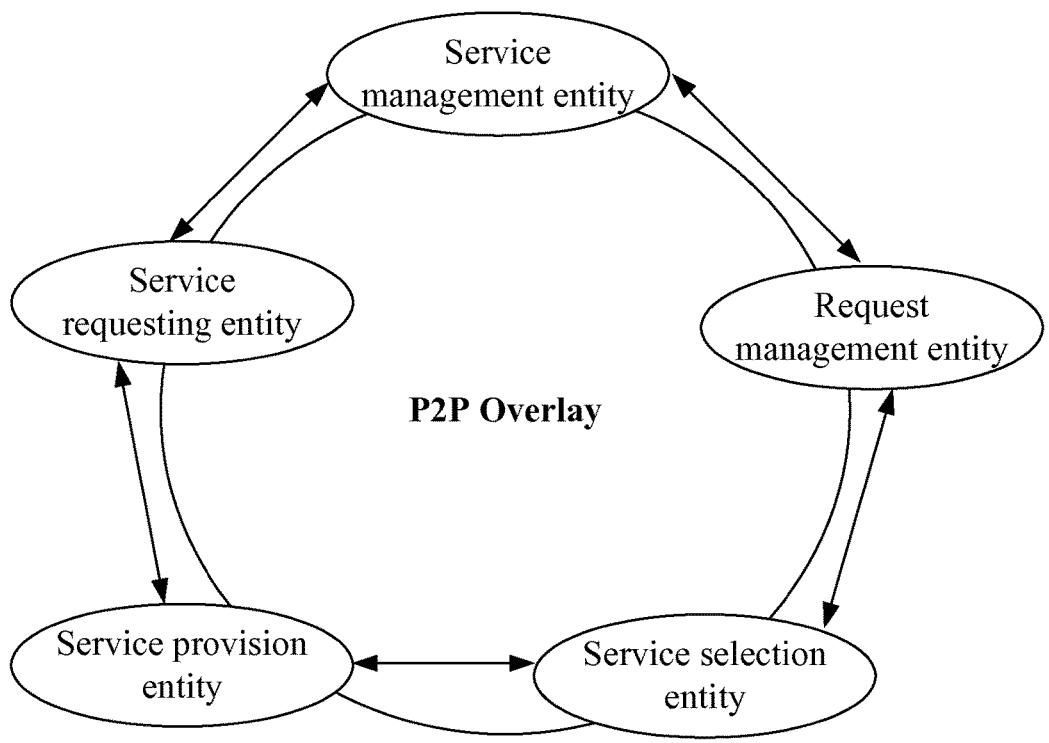
FIG. 9 illustrates a structure of a P2P network system according to a second embodiment of the present invention.

Optionally, as shown in FIG. 9, the P2P network system further includes:

a request management entity, configured to receive the request information of all service requesting entities that are currently transferring content and generate statistics of the request information of all service requesting entities that are currently transferring content;

a service management entity, configured to switch the data stream currently transferring content from the current service provision entity to the selected new service provision entity; and the service selection entity, further configured to: obtain the statistics of request information of all service requesting entities that are currently transferring content, decide an evaluated grade of the data stream currently transferring content according to the statistics of request information of all service requesting entities that are currently transferring content, and select a new service provision entity of the appropriate service capability according to the evaluated grade of the data stream currently transferring content.

The P2P network system of the embodiment of the present invention decides different grades for different service data streams and provides differentiated maintenance for the service data steams of different grades. The system selects a reliable service provision entity for an important service request or an important data stream and thereby avoids frequent switching of a data stream from one service provision entity to another due to the instability of the service provision entity.

Optionally, the P2P network system of the embodiment of the present invention further includes:

a request management entity, configured to receive the request information of all service requesting entities that are currently transferring content and generate statistics of the request information of all service requesting entities that are currently transferring content;

a service management entity, configured to: obtain the statistics of the request information of all service requesting entities that are currently transferring content from the request management entity, decide an evaluated grade of the data stream currently transferring content according to the statistics of the request information of all service requesting entities, request the service selection entity to select a service provision entity of the appropriate service capability according to the evaluated grade of the data stream currently transferring content, and switch the data stream currently transferring content from the current service provision entity to the selected new service provision entity; and the service selection entity, further configured to select a new service provision entity of the appropriate service capability according to the request of the service management entity.

Figure 10:
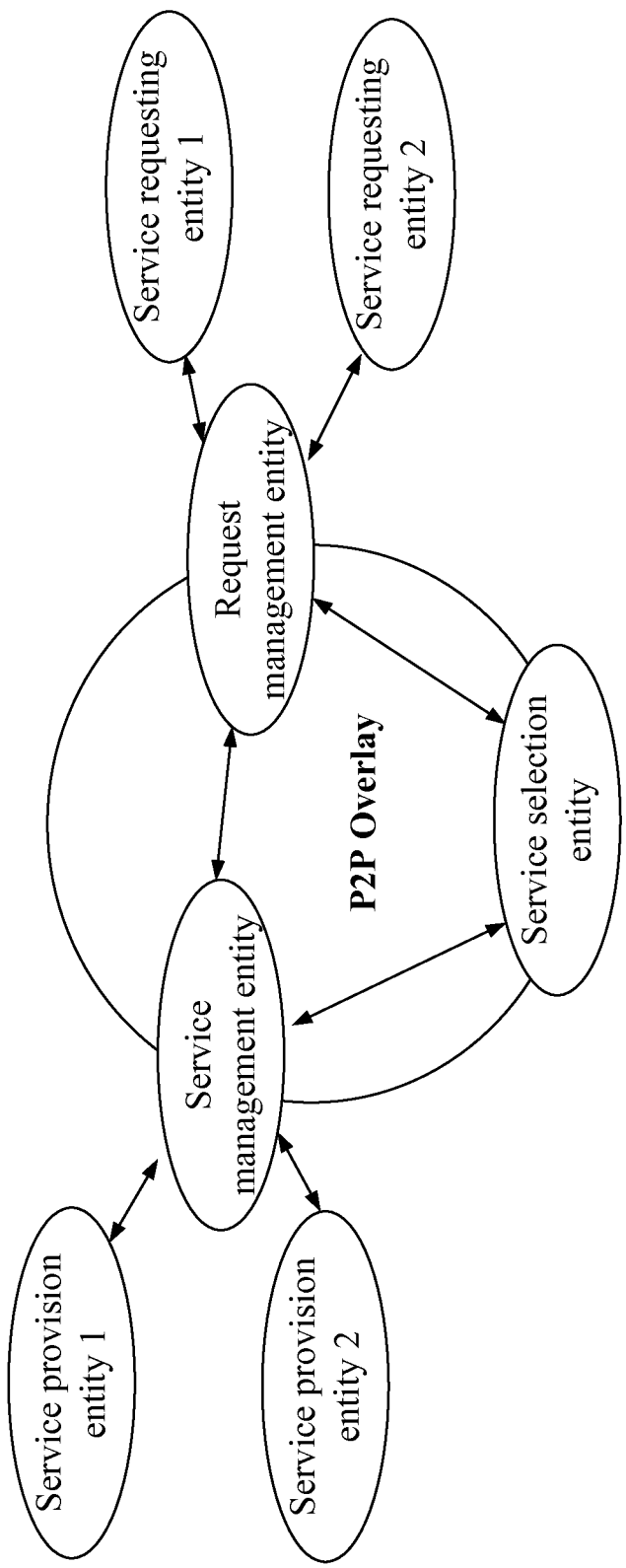
FIG. 10 illustrates a structure of a P2P network system according to a third embodiment of the present invention.

Optionally, when the P2P network has a peer-client structure, as shown in FIG. 10, the P2P network includes: at least one service provision entity, a service requesting entity, a service selection entity, a service management entity, and a request management entity, where each service provision entity belongs to a peer managed by the service management entity and the service requesting entity belongs to a peer managed by the request management entity. The service management entity is configured to: receive service capability information of service provision entities from the service provision entities, send the service capability information of the service provision entities to the service selection entity, and store the service capability information of the service provision entities locally. When all service provision entities currently transferring content belong to one peer managed by the service management entity, the service management entity selects a service provision entity of the appropriate service capability according to the locally stored service capability information of the service provision entities, and thereby reduces the delay caused by selection of a service provision entity by the service selection entity. The request management entity is configured to receive service request information from the service requesting entity and send the request information to the service selection entity.

Figure 11:
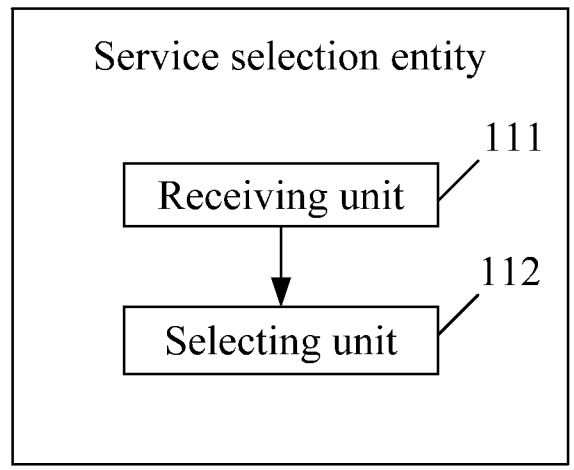
FIG. 11 illustrates a structure of a service selection entity according to a first embodiment of the present invention.

FIG. 11 illustrates a service selection entity provided according to an embodiment of the present invention. The service selection entity includes:

a receiving unit 111, configured to receive service capability information published by service provision entities and a service type requested by a service requesting entity; and a selecting unit 112, configured to select a service provision entity of an appropriate service capability according to the service capability information of service provision entities and the service request information of the service requesting entity.

In the service selection entity of the embodiment of the present invention, the receiving unit receives service capability information published by service provision entities and the service type requested by a service requesting entity; the selecting unit selects a service provision entity of the appropriate service capability according to the service request information of the service requesting entity. Thus, the service selection entity is able to select a service provision entity that meets the need of a client from the heterogeneous service provision entities in the P2P network.

Figure 12:
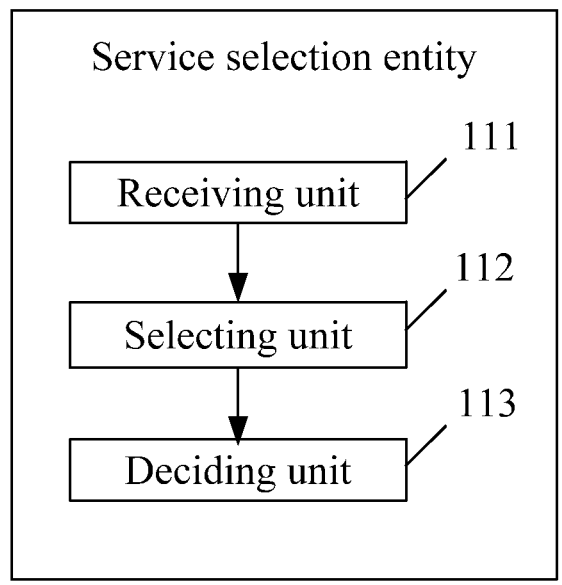
FIG. 12 illustrates a structure of a service selection entity according to a second embodiment of the present invention.

Optionally, as shown in FIG. 12, the service selection entity of the embodiment of the present invention further includes: a deciding unit 113, configured to decide an evaluated grade for a data stream currently transferring content according to statistics of request information of all service requesting entities; the receiving unit 111, further configured to receive the statistics of request information of all service requesting entities currently transferring content; and the selecting unit 112, further configured to select a new service provision entity of the appropriate service capability according to the evaluated grade of the data stream currently transferring content. The service selection entity of the embodiment of the present invention decides different grades for different service data streams and provides differentiated maintenance for service data streams of different grades.

A request management entity according to an embodiment of the present invention includes:

a receiving unit, configured to receive requests of all service requesting entities currently transferring content;

a statistics unit, configured to generate statistics of request information of all service requesting entities currently transferring content; and a sending unit, configured to send the statistics of request information of all service requesting entities.

In the request management entity of the embodiment of the present invention, the receiving unit receives the requests of all service requesting entities currently transferring content; the statistics unit generates statistics of the request information of all service requesting entities currently transferring content; and the sending unit sends the statistics of the request information of all service requesting entities. Thus, the request management entity is able to generate statistics related to the requests of service requesting entities currently transferring content and thereby provides a reference for the decision of the grade of the data stream currently transferring content.

Figure 13:
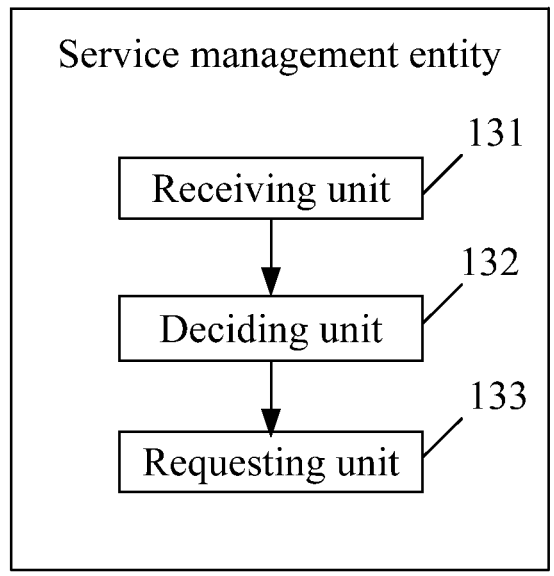
FIG. 13 illustrates a structure of a service management entity according to a first embodiment of the present invention.

FIG. 13 illustrates a service management entity provided according to an embodiment of the present invention. The service management entity includes:

a receiving unit 131, configured to receive statistics of request information of all service requesting entities;

a deciding unit 132, configured to decide an evaluated grade of a data stream currently transferring content according to the request information statistics of all service requesting entities; and a requesting unit 133, configured to request the service selection entity to select a service provision entity of an appropriate service capability according to the evaluated grade of the data stream currently transferring content.

The service management entity of the embodiment of the present invention decides different grades for different service data streams and provides differentiated maintenance for the service data steams of different grades. The service management entity requests the service selection entity to select a reliable service provision entity for an important service request or an important data stream and thereby avoids frequent switching of a data stream from one service provision entity to another due to the instability of the service provision entity.

Figure 14:
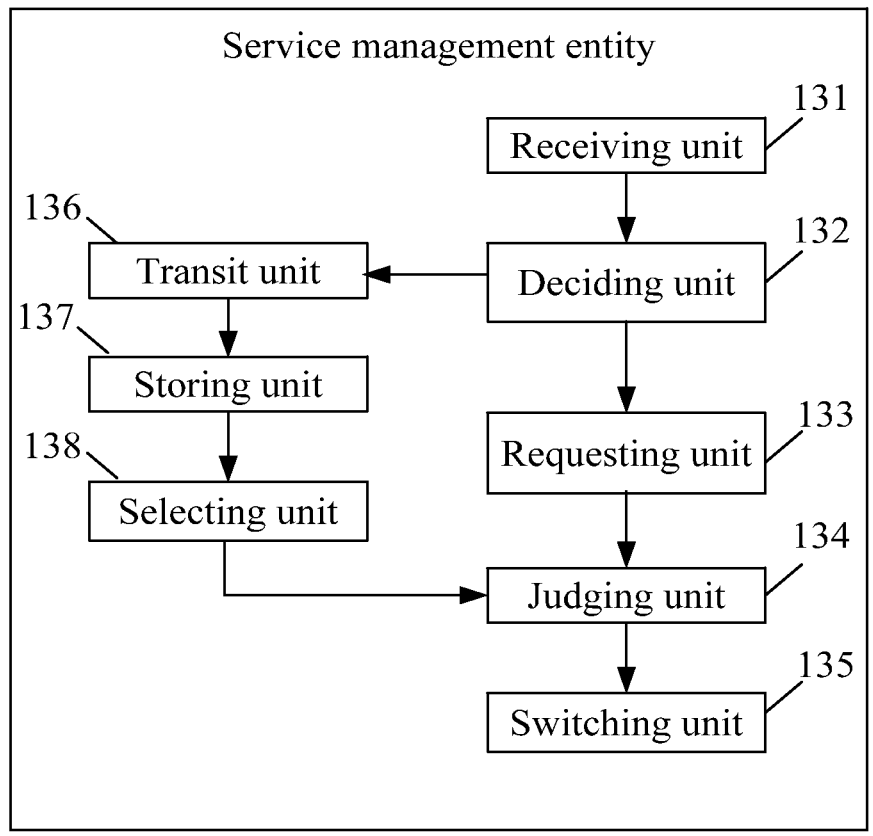
FIG. 14 illustrates a structure of a service management entity according to a second embodiment of the present invention.

Optionally, as shown in FIG. 14, the service management entity of the embodiment of the present invention further includes:

a judging unit 134, configured to judge whether the current service provision entity is faulty; and a switching unit 135, configured to switch the data stream currently transferring content from the current service provision entity to the selected new service provision entity when the current service provision entity is faulty.

In the case of an important data stream, or when the current service provision entity is faulty, the data stream is switched to a service provision entity of a higher service capability. Thus, a reliable service provision entity is selected for an important service request or an important data stream, which avoids the frequent switching of a data stream from one service provision entity to another due to the instability of the service provision entity. The service management entity of the embodiment of the present invention may include no judging unit and the switching unit initiates a switching procedure directly, thus avoiding the delay caused by source fault detection which is necessary if a data stream is switched only after a source fault is detected.

Optionally, as shown in FIG. 14, the service management entity of the embodiment of the present invention further includes:

a transit unit 136, configured to receive the service capability information of service provision entities and send the service capability information to a storing unit 137;

the storing unit 137, configured to store the service capability information of service provision entities; and a selecting unit 138, configured to select a service provision entity of the appropriate service capability according to locally stored service capability information of service provision entities when all service provision entities currently transferring content belong to one peer managed by the service management entity.

When the P2P network has a peer-client structure, the transit unit receives the service capability information of service provision entities and sends the information to the storing unit; the storing unit stores the service capability information of service provision entities; and when all service provision entities currently transferring content belong to one peer managed by the service management entity, the selecting unit selects a service provision entity of the appropriate service capability according to locally stored service capability information of service provision entities, thus reducing the delay caused by the selection of a service provision entity by the service selection entity.

A service provision entity according to an embodiment of the present invention includes:

a providing unit, configured to provide service content; and a sending unit, configured to publish service capability information of the service provision entity.

In the service provision entity of the embodiment of the present invention, the sending unit publishes the service capability information of the service provision entity when publishing content. Thus, different service provision entities can be selected for different client needs according to the different service capabilities provided by the service provision entities.

The embodiments of the present invention are applicable to P2P overlay networks with a peer-client structure and also applicable to unstructured P2P networks with a non-peer-client structure.

In conclusion, the above are merely preferred embodiments of the present invention. However, the scope of the present invention is not limited thereto. Changes or replacements readily apparent to persons skilled in the prior art within the technical scope of the present invention should fall within the scope of the present invention. Therefore, the scope of the present invention is subject to the appended claims.

What is claimed is:

1. A method applied in a peer-to-peer network, the network comprising a plurality of first peer devices, a plurality of second peer devices and a network device, the network device being communicatively connected to the plurality of first peer devices and the plurality of second peer devices, wherein the method comprises:

obtaining, by the network device, statistics of request information of the plurality of first peer devices, wherein specific content is requested by the plurality of first peer devices and the plurality of second peer devices are configured to provide the specific content;

deciding, by the network device, a value of the specific content based on the statistics of request information of the plurality of first peer devices wherein the value indicates a degree of importance of the specific content and a mapping between the plurality of second peer devices and the specific content is maintained by the network device; and selecting, by the network device, a second peer device that is to provide the specific content to the plurality of first peer devices according to the value of the specific content and the mapping between the plurality of second peer devices and the specific content, wherein the second peer device that is to provide the specific content to the plurality of first peer devices is a second peer device within the plurality of second peer devices.

2. The method of claim 1, wherein the step of selecting the second peer device that is to provide the specific content to the plurality of first peer devices according to the value of the specific content and the mapping between the plurality of second peer devices and the specific content comprises:

selecting, by the network device, a first device if the value of the specific content is of a first value; and selecting, by the network device, a second device if the value of the specific content is of a second value, wherein the first device and the second device have different service capabilities.

3. The method of claim 1, further comprising:

switching from a current device to the second peer device that is to provide the specific content.

4. The method of claim 3, before the step of switching from the current device to the second peer device that is to provide the specific content, the method further comprises:
   determining, by the network device, that the current device is faulty.

5. The method of claim 1, wherein the statistics of request information comprises at least: a quantity of the plurality of first peer devices and delay sensitiveness of each of the plurality of first peer devices, and/or real-time requirement of each of the plurality of first peer devices.

6. The method of claim 1,
   wherein the peer-to-peer network is one of: a peer-to-peer overlay network with a peer-client structure, and an unstructured peer-to-peer network with a non-peer-client structure.

7. A network device in a peer-to-peer (P2P) network, the network comprising a plurality of first peer devices, a plurality of second peer devices and the network device, the network device being communicatively connected to the plurality of first peer devices and the plurality of second peer devices, wherein the network device comprises a non-transitory computer readable memory and a processor coupled to the memory which stores instruction codes which when executed by the processor, configure the network device to:
   obtain statistics of request information of the plurality of first peer devices, wherein specific content is requested by the plurality of first peer devices and the plurality of second peer devices are capable of providing the specific content;
   decide a value of the specific content based on the statistics of request information of the plurality of first peer devices wherein the value indicates a degree of importance of the specific content and a mapping between the plurality of second peer devices and the specific content is maintained by the network device; and
   select a second peer device that is to provide the specific content to the plurality of first peer devices according to the value of the specific content and the mapping between the plurality of second peer devices and the specific content, wherein the second peer device that is to provide the specific content to the plurality of first peer devices is a second peer device within the plurality of second peer devices.

8. The network device of claim 7, wherein the network device is configured to:
   select a first device if the value of the specific content is of a first value; and
   select a second device if the value of the specific content is of a second value, wherein the first device and the second device have different service capabilities.

9. The network device of claim 7, wherein the network device is further configured to:
   switch from a current device to the second peer device that is to provide the specific content.

10. The network device of claim 9, wherein the network device is configured to:
   determine that the current device is faulty before the step of switching from the current network device to the second peer device that is to provide the specific content.

11. The network device of claim 7, wherein the statistics of request information comprises at least: a quantity of the plurality of first peer devices and delay sensitiveness of each of the plurality of first peer devices, and/or real-time requirement of each of the plurality of first peer devices.

12. The network device of claim 7, wherein the peer-to-peer network is one of: a peer-to-peer overlay network with a peer-client structure, and an unstructured peer-to-peer network with a non-peer-client structure.

* * * * *